(12) United States Patent
Briney

(10) Patent No.: US 12,550,866 B1
(45) Date of Patent: Feb. 17, 2026

(54) CRAWLING INSECT REPELLING PET DISH PLATFORM

(71) Applicant: Douglas Charles Briney, Newport Beach, CA (US)

(72) Inventor: Douglas Charles Briney, Newport Beach, CA (US)

( * ) Notice: Subject to any disclaimer, the term of this patent is extended or adjusted under 35 U.S.C. 154(b) by 0 days.

(21) Appl. No.: 18/760,226

(22) Filed: Jul. 1, 2024

Related U.S. Application Data

(60) Provisional application No. 63/511,241, filed on Jun. 30, 2023.

(51) Int. Cl.
*A01K 5/01* (2006.01)

(52) U.S. Cl.
CPC .................................. *A01K 5/0142* (2013.01)

(58) Field of Classification Search
CPC ............................ A01K 5/0114; A01K 5/0142
USPC ..................................................... 119/61.53
See application file for complete search history.

(56) References Cited

U.S. PATENT DOCUMENTS

| | | | |
|---|---|---|---|
| 2,030,310 A * | 2/1936 | McWilliams | A01M 1/223 43/112 |
| 2,584,301 A | 2/1952 | Sinclair | |
| 4,471,561 A * | 9/1984 | Lapierre | A01M 1/18 361/232 |
| 4,784,086 A * | 11/1988 | Hand | A01M 1/24 119/61.53 |
| 4,827,874 A | 5/1989 | Mahan | |
| 4,839,984 A | 6/1989 | Saunders et al. | |
| 5,205,242 A * | 4/1993 | Kasselman | A01K 5/0142 119/61.53 |
| 5,467,738 A | 11/1995 | Cass | |
| 5,732,503 A | 3/1998 | Cheng | |
| 5,857,428 A | 1/1999 | Gitzen | |
| 5,909,181 A * | 6/1999 | Golzmane | G01R 31/52 340/649 |
| 6,848,392 B1 * | 2/2005 | Kreutzer, Jr. | A01M 1/223 119/61.3 |
| 2010/0212212 A1 | 8/2010 | Peles | |
| 2022/0140509 A1 | 5/2022 | Saiz | |
| 2023/0000068 A1 | 1/2023 | Warthen | |

* cited by examiner

*Primary Examiner* — Brady W Frazier

(57) ABSTRACT

The present invention relates to a pet food or a pet dish stand which is capable of keeping crawling insects away from the pet food, without harming or killing the crawling insects. It comprises of a device with a base, a vertical post with electronic assembly, and a capital which holds the pet food. The electronic assembly within the vertical post is connected to at least two conductors with which a crawling insect makes contact and completes an electrical current. This electrical current is of sufficient voltage and amperage to allow for the crawling insect to be deterred but not killed. As such, this device requires little maintenance and is capable of functioning for extended periods of time.

14 Claims, 10 Drawing Sheets

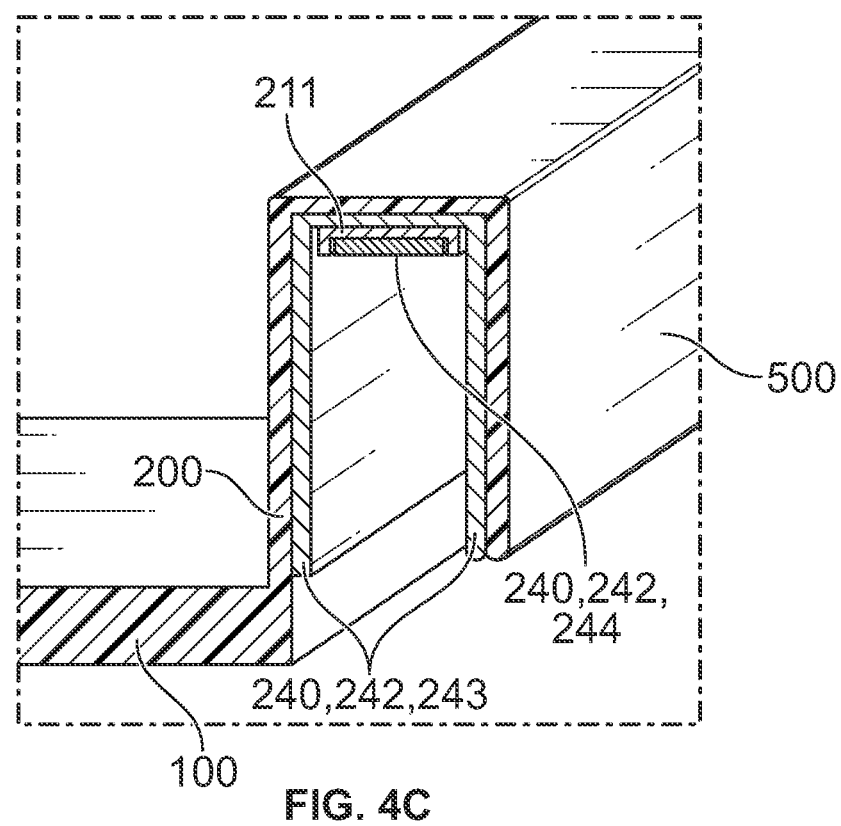

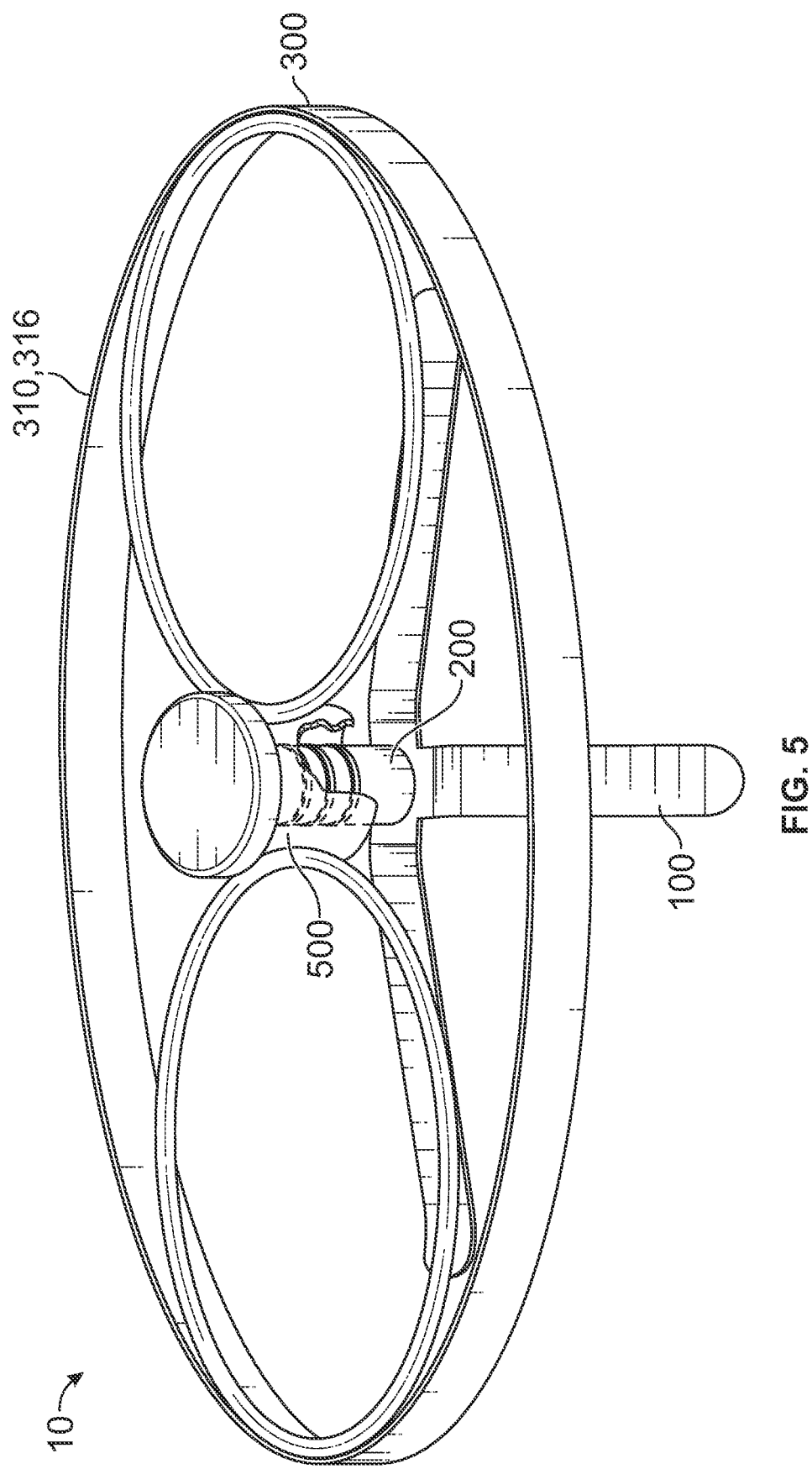

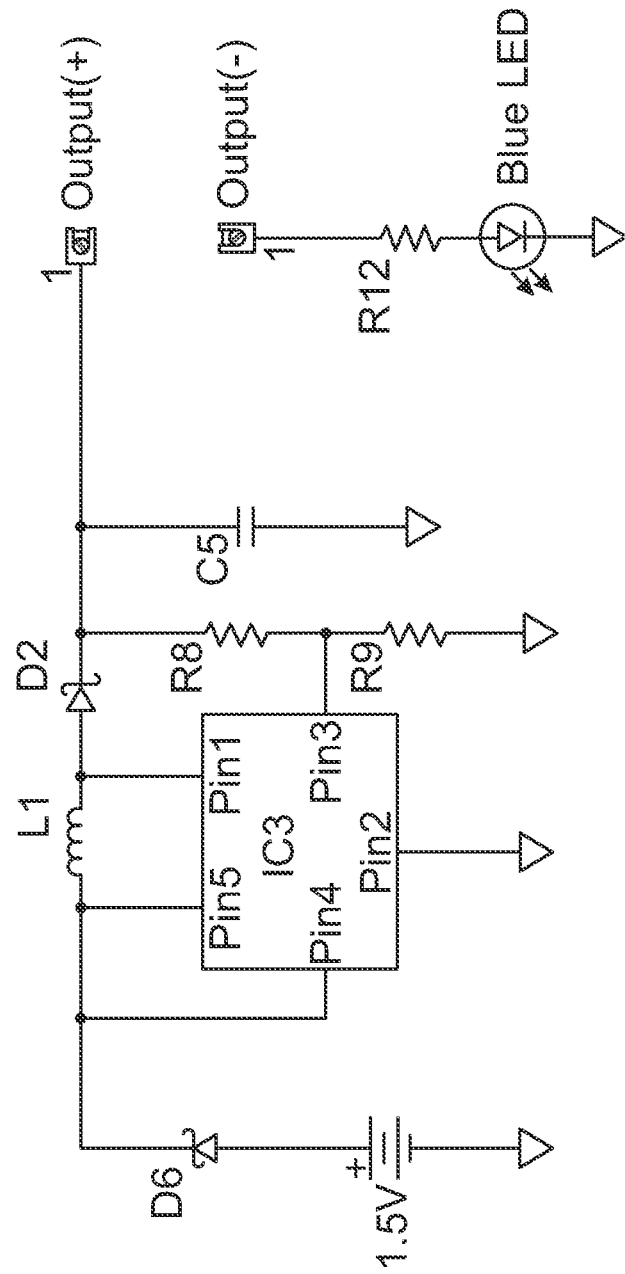

CRAWLING INSECT REPELLING PET DISH PLATFORM

CROSS REFERENCE

This application is an original non-provisional application claiming benefit of the provisional application, with title, Crawling Insect Repelling Pet Dish Platform, with application No. 63/511,241, filed on 30 Jun. 2023.

BACKGROUND OF THE INVENTION

Field of the Invention

The present invention relates to an electrical insect repelling device which does not eradicate or kill the insects.

Background of the Invention

Owners and keepers of pets are often faced with a problem where openly placed pet food attracts insects and bugs which in turn contaminates the food that is eaten by the pets. Also, this contamination can sometimes cause illnesses in pets by spreading foodborne bacteria and disease. Specifically, pet food in pet feeding dishes can attract ants, both indoors and outdoors. Once ants discover food, they often swarm it by the hundreds, making the food inedible for the pet.

Others have devised various means to trap and terminate insects or bugs that attempt to get into pet food. Currently, pet dishes with built-in water moats and pet food bowl stands with a gel barrier exist in the market. Both of these are messy and require periodic changing of water or gel. Additionally, they kill the ants, insects, or bugs that get near the pet food. Dead insects can decompose and contaminate the area or otherwise make the feeding area unpalatable for the pet. Many people would prefer to keep pet food cleared of insects without killing the insects; especially ants, which are beneficial for the ecosystem. Another type of invention that is currently on the market is a small platform with a maze-like structure that ants would have to pass through in order to get to the food. There is presently an unmet need for a pet dish that is clean, requires little maintenance, can be made in a variety of shapes, and is capable of keeping the insects and/or bugs out of the pet food, without harming those insects and/or bugs.

U.S. Pat. No. 4,827,874 discloses an electrified pet feeding dish that prevents crawling insects from gaining access to a pet's food or water. This invention also eradicates or kills insects. It is an attachment that attaches to the sidewall of any pet dish via a recess or groove on the sidewall, to make the dish insect-resistant. The device comprises two strips that conduct electricity and are secured to the exterior surface of the sidewall of the dish to completely encircle the dish and are further connected to a releasably attached low-voltage DC battery, specifically a 9V battery, which is also connected to the dish. These strips maybe tape and stick strips where the metallic strips have an adhesive backing. The insect completes the circuit in this device. The current passing through the insect is so high that it will not only discourage the insect from traveling to the pet food, but it will also kill the insect. Also, in this invention, no current-limiting device was described, and there are no means to prevent water or spilled wet food from bridging the metallic strips causing a short circuit to the battery which can damage both the battery and the metallic strips.

U.S. Pat. No. 6,848,392B1 discloses a helical insect terminating assembly that kills crawling insects before they gain access to a pet's food or water.

U.S. Pat. No. 4,839,984A discloses a system for repelling crawling insects by way of training and controlling the insects. This device comprises of a device which uses electrical shock of 15 micro Amps to deter insects from crawling to pet food. This device is also slippery and has a reflective surface which aides in training or controlling the crawling insects so as to divert their direction from the pet food. If the insect completes the electrical circuit in this device, the insect is short-circuited and thus deterred from entering the pet food.

U.S. Pat. No. 5,732,503 discloses a blockading apparatus which uses a concentrically placed circuit which can conduct an electrical shock of 5 mA to repel an ant.

SUMMARY OF THE INVENTION

The present invention addresses the need for a pet dish/pet dish stand that is clean, requires little maintenance, can be made in a variety of shapes, and is capable of keeping the ants, and crawling insects out of the pet food, without harming those insects. The present invention does not require water, gel, or high voltage. This invention is also capable of functioning for relatively long intervals with a battery, unlike anything in the prior art. In some embodiments, this invention is capable of functioning for about a year, using a single replaceable 1.5V AA dry cell battery or six months using a 1.5V AAA dry cell battery. It can be used on a daily basis by a pet owner or intermittently, such as at a pet owner's vacation home. The length of time this invention can be functionally powered will vary on the size of the battery used. For example, this invention can also be made to use a single 1.5V AAA size battery, but will have a shorter battery life, or it can be made with a 1.5V AA, C, or D size battery, or a series of batteries, to have a longer battery life.

BRIEF DESCRIPTION OF THE DRAWINGS

Non-limiting and non-exhaustive examples of several of the various embodiments of the present subject matter are described with references to the following figures, and reference numbers refer to the same features throughout the various views and embodiments unless otherwise specified.

FIG. 4C is a perspective view of an embodiment of the device for repelling insects showing the device similar to FIG. 4B, configured as a mat with a base connected to a vertical post along the sides of the mat and an underside skirt providing a protective surface for the at least two conductors with electricity between which there are insulating spacers.

FIG. 5 is a front view of an embodiment of the device for repelling insects showing the base configured as a four-legged, stable structure connected to the vertical post with an underside skirt, which is further connected to a capital which is a set of rims supporting the pet dishes.

FIG. 7 illustrates one embodiment of the electronic assembly's DC-to-DC booster circuit components.

Figure 1:
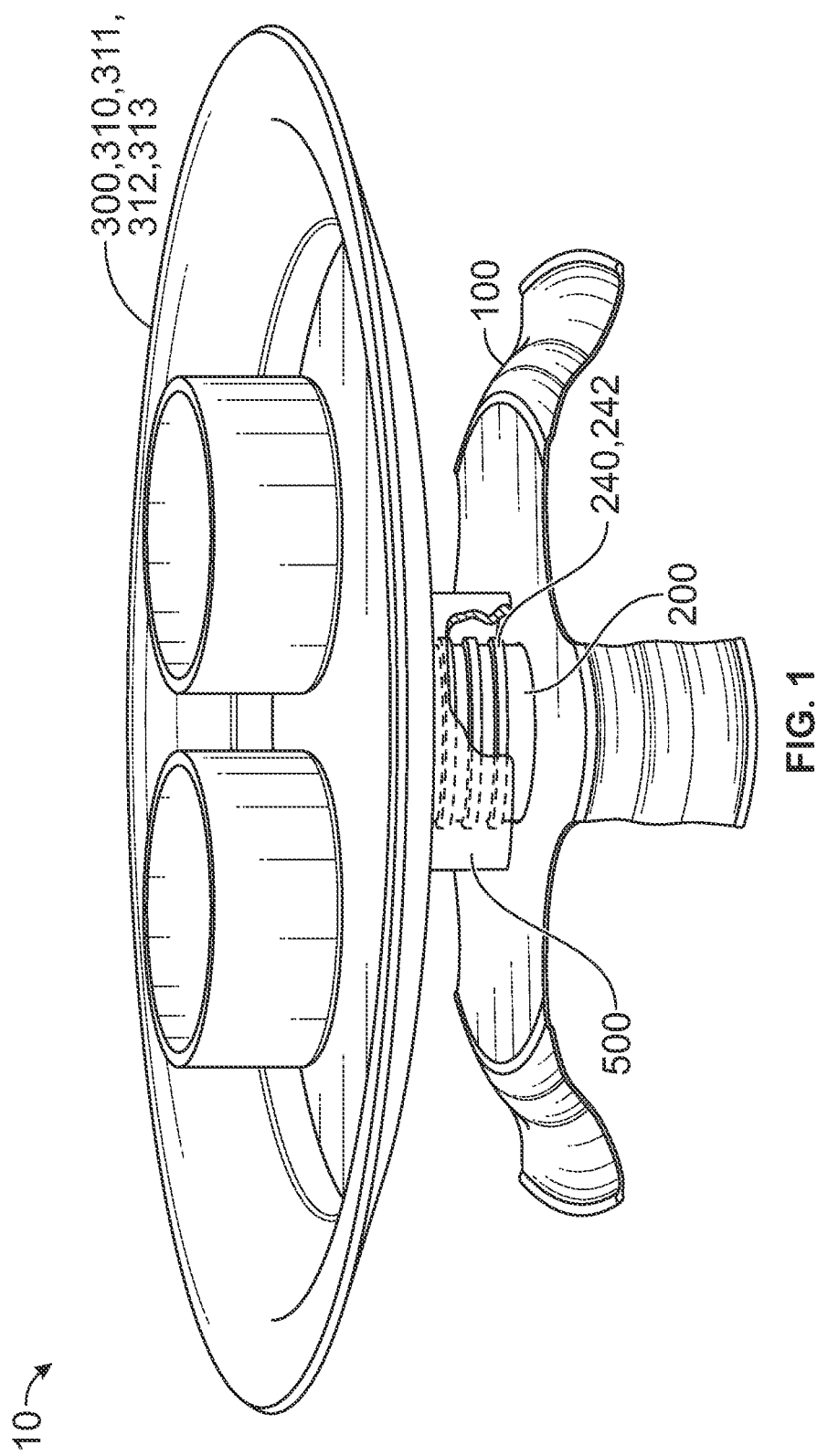
FIG. 1 is a front view of an embodiment of a device for repelling insects showing the device for repelling crawling insects where a base is connected to a vertical post which has at least two conductors with electricity which are at least two conductive bands. This vertical post connects the base to a capital configured as a platform with an upper surface to hold pet food in at least one dish.

Corresponding reference characters indicate corresponding components throughout the several views of the drawings. Skilled artisans will appreciate that elements in the figures are illustrated for simplicity and clarity and have not necessarily been drawn to scale. Also, common but well-understood elements that are useful or necessary in a commercially feasible embodiment are often not depicted in order to facilitate a less obstructed view of these various embodiments. Additionally, the disclosed architecture is sufficiently configurable, such that it may be utilized in ways other than what is shown.

DETAILED DESCRIPTION OF INVENTION

In this Specification, which includes the figures, claims, and this detailed description, reference is made to particular and possible features of the embodiments of the subject matter, including method steps. These particular and possible features are intended to include all possible combinations of such features, without exclusivity. For instance, where a feature is disclosed in a specific embodiment or claim, that feature can also be used, to the extent possible, in combination with and/or in the context of other aspects and embodiments of the subject matter, and in the subject matter generally. Additionally, the disclosed architecture is sufficiently configurable, such that it may be utilized in ways other than what is shown.

The purpose of the Abstract of this Specification is to enable the U.S. Patent and Trademark Office and the public generally, and especially the scientists, engineers and practitioners of the art who are not familiar with patent or legal terms or phrasing, to determine quickly from a cursory inspection the nature and essence of the technical disclosure of the application. The Abstract is not intended to be limiting as to the scope of the subject matter in any way.

In the following description, numerous specific details are given in order to provide a thorough understanding of the present embodiments. It will be apparent, however, to one having ordinary skill in the art, that the specific detail need not be employed to practice the present embodiments. On other instances, well-known materials or methods have not been described in detail in order to avoid obscuring the present embodiments. When limitations are intended in this Specification, they are made with expressly limiting or exhaustive language.

Reference throughout this Specification to "one embodiment", "an embodiment", "one example" or "an example" means that a particular feature, structure, or characteristic described in third member with the embodiment or example is included in at least one embodiment of the present embodiments. Thus, appearances of the phrases "in one embodiment", "according to an embodiment", "in an embodiment", "one example", "for example", "an example", or the like, in various places throughout this Specification are not necessarily all referring to the same embodiment or example. Furthermore, the particular features, structures, or characteristics may be combined in any suitable combinations and/or sub-combinations in one or more embodiments or examples.

The terms "comprises", "comprising", "includes", "including", "has", "having", "being", "could", "could have" or their grammatical equivalents, are used in this Specification to mean that other features, components, materials, steps, etc. are optionally present as a non-exclusive inclusion. For instance, a device "comprising" (or "which comprises") components A, B, and C can contain only components A, B, and C, or can contain not only components A, B, and C but also one or more other components. For example, a method comprising two or more defined steps can be carried out in any order or simultaneously, unless the context excludes that possibility; and the method can include one or more other steps which are carried out before any of the defined steps, between two of the defined steps, or after all the defined steps, unless the context excludes that possibility.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

Examples or illustrations given are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these example or illustrations are utilized will encompass other embodiments, which may or may not be given in this Specification, and all such embodiments are intended to be included within the scope of that term or terms. Language designating such nonlimiting examples and illustrations includes, but is not limited to: "for example", "for instance", "etc.", "or otherwise", and "in one embodiment."

The phrase "at least" followed by a number is used to denote the start of a range beginning with that number, which may or may not be a range having an upper limit, depending on the variable defined. For instance, "at least one" means one or more.

In this specification. "a" and "an" and similar phrases are to be interpreted as "at least one" and "one or more." In this specification, the term "may" or "can be" or "could be" is to be interpreted as "may, for example." In other words, the term "may" is indicative that the phrase following the term "may" is an example of one of a multitude of suitable possibilities that may, or may not, be employed to one or more of the various embodiments.

The term "couple" or "coupled" when used in this specification and appended claims refers to an indirect or direct physical third member between the identified elements, components, or objects. Often the manner of the coupling will be related specifically to the manner in which the two coupled elements interact.

The term "directly coupled" or "coupled directly," when used in this specification and appended claims, refers to a physical third member between identified elements, components, or objects, in which no other element, component, or object resides between those identified as being directly coupled.

The terms "removable", "removably coupled", "removably disposed," "readily removable", "readily detachable", "detachably coupled", "separable," "separably coupled," "releasably attached", "detachably attached", "detachably connected" and similar terms, when used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The phrase "a plurality of" followed by a feature, component, or structure is used to mean more than one, specifically including a great many, relative to the context of the component.

It is the applicant's intent that only claims that include the express language "means for" or "step for" be interpreted under 35 U.S.C. § 112. Claims that do not expressly include the phrase "means for" or "step for" are not to be interpreted under 35 U.S.C. § 112.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purpose required by law, but otherwise reserves all copyright rights whatsoever.

The present invention is a device for repelling insects. It comprises of a base, a vertical post which extends from the base, and a capital which rests on top of the vertical post. The base used in this invention can be any foundation which is a flat, planar structure or multi-legged, stable structure, a vertical post which is an upright columnar structure, and a capital which is a flat structure to hold pet food. The vertical post of the present invention houses the electronic assembly within the hollow space inside the inner surface of the vertical component. The outer surface of the vertical post has at least two conductors which connect to the electronic assembly. In the space between the at least two conductors, there can be a thin insulating spacer. The vertical post itself can also act as an insulating surface. In some embodiments, the vertical post itself is the at least two conductors. The vertical post of the present invention can either wholly house the electronic assembly within its hollow space by way of an internal energy source or extend out of the vertical post and connect to an external power source. The capital which rests on the vertical post consists of an underside skirt and can be of any shape and can be used to hold pet food or a pet food dish. The capital can be a flat surface capable of holding a pet dish of any shape or type. The underside skirt of the capital protects pets and users from making accidental contact. It can also be a single pet food bowl, two pet food bowls, or a silicone mat. This general structure of a base, a vertical post, and a capital has several advantages. This structure allows the pet owner to use any type and size of pet feeding dish. It also provides an enclosed place for the electronic assembly. This electronic assembly is long lasting and requires little maintenance. If a crawling insect attempts to get to the pet food on the capital of the device, it will have to crawl vertically along the vertical post and will make contact with the at least two conductors. When the crawling insect makes contact with the at least two conductors, it will close the circuit triggering a shock high enough to repel the crawling insect but low enough so as to not harm the crawling insect. Accordingly, the present invention addresses the need for a pet dish/pet dish stand that is clean, requires little maintenance, can be made in a variety of shapes, and is capable of keeping the ants, and crawling insects out of the pet food, without harming those insects.

FIG. 1 is a front view of an embodiment of a device for repelling insects 10 showing the base 100 with feet or legs connected to a vertical post 200. This vertical post has at least two conductors with electricity 240 which are at least two conductive bands 242 on its outer surface. This vertical post 200 further connects the base 100 to a capital 300 with an upper surface 310 and an underside skirt 500. The upper surface 300 is configured as a platform to hold pet food in at least one dish 312, which can also be two dishes 313. A crawling insect will have to go from the base 100, up the vertical post 200 to access the pet food placed on the capital 300. However, when it crawls up the vertical post, it has to bridge the at least two conductors with electricity 240. By doing so, it will trigger the circuit within the electronic assembly which will let the current pass and shock the crawling insect.

Figure 2A:
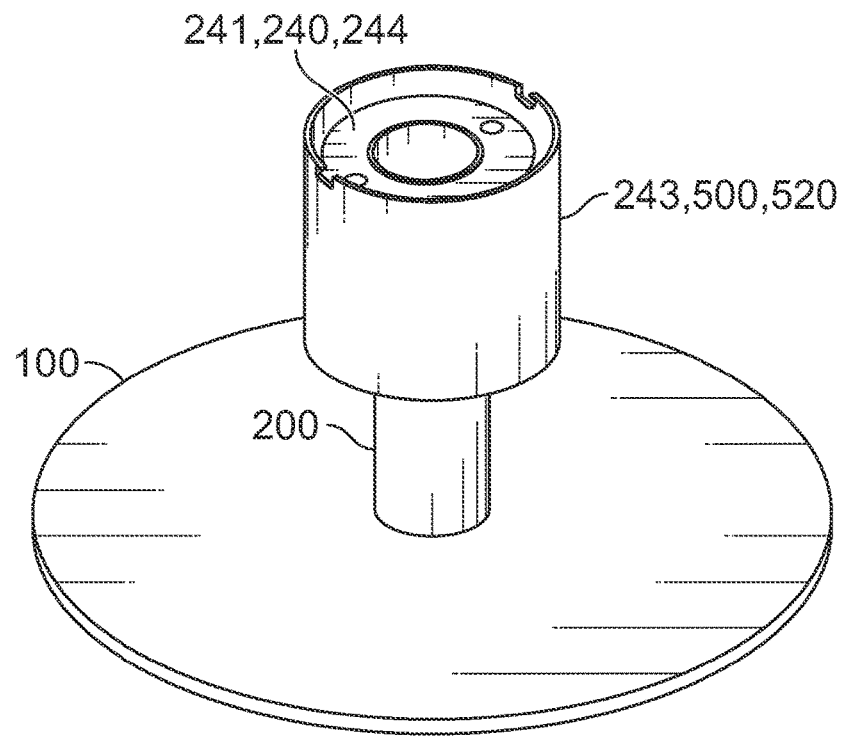
FIG. 2A is a front view of an embodiment of a device for repelling insects showing the device with a base that is circular in shape connected to a vertical post with an underside skirt. The underside skirt protects the at least two conductors with electricity which is a horizontally placed conductive ring positioned between the outer surface of the vertical post and the inner surface of the underside skirt.

FIG. 2A is a front view of an embodiment of a device for repelling insects showing the base 100 which is circular in shape and a vertical post 200. In this embodiment, the vertical post also has an underside skirt 500/520. In this embodiment, the at least two conductors with electricity is the vertical post itself, which is conductive, an underside skirt, which is also conductive, and a conductive ring 241. This conductive ring 241 is further comprised of three conductive bands with two outer conductive bands 243 and one middle band 244, and is horizontally positioned between the outer surface of the vertical post and the inner surface of the underside skirt.

Figure 2B:
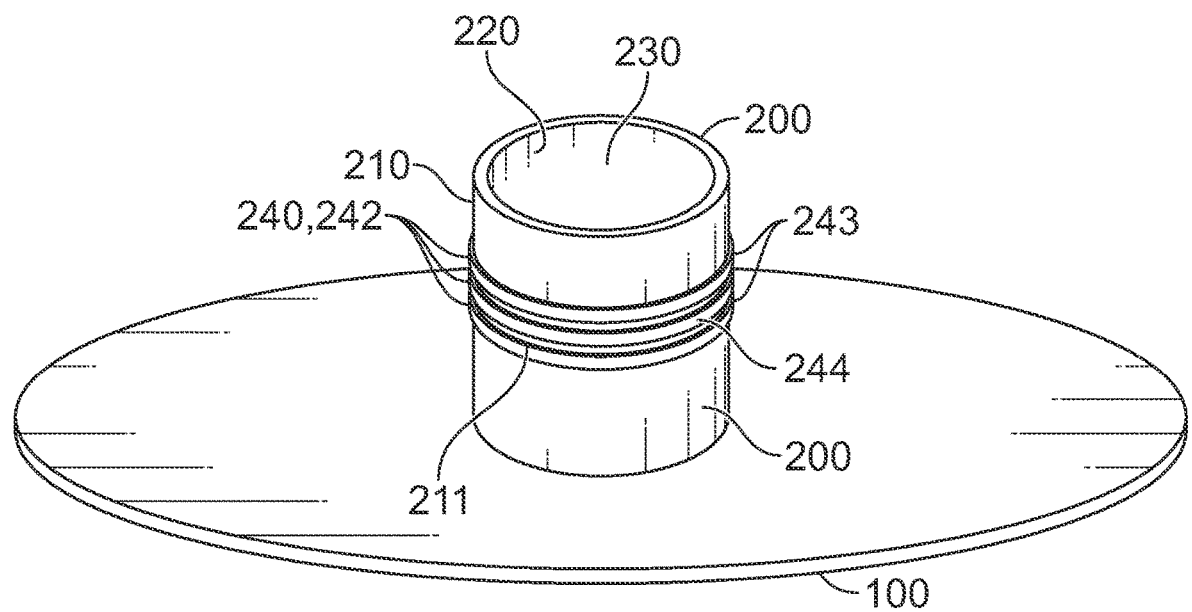
FIG. 2B is a front view of an embodiment of the device for repelling insects showing a base which is circular in shape connected to a vertical post with an outer surface, inner surface, and a hollow space inside the inner surface. The outer surface of this vertical post has at least two conductors with electricity, which are at least two conductive bands, with outer bands and middle band.

FIG. 2B is a front view of an embodiment of the device for repelling insects showing a base 100 that is circular in shape and a vertical post 200. This vertical post comprises of an outer surface 210, an inner surface 220, and a hollow space inside the inner surface 230 which can accommodates the electronic assembly (not shown in this drawing). The outer surface 210 of this vertical post 200 has at least two conductors with electricity 240, which are also at least two conductive bands 242 around it. These at least two conductive bands 242 are three conductive bands with outer conductive bands 243 and middle band 244. The spaces between the outer conductive bands 243 and the middle band 244 comprises of an insulating spacer 211 which leaves the circuit open for the crawling insect to bridge.

Figure 2C:
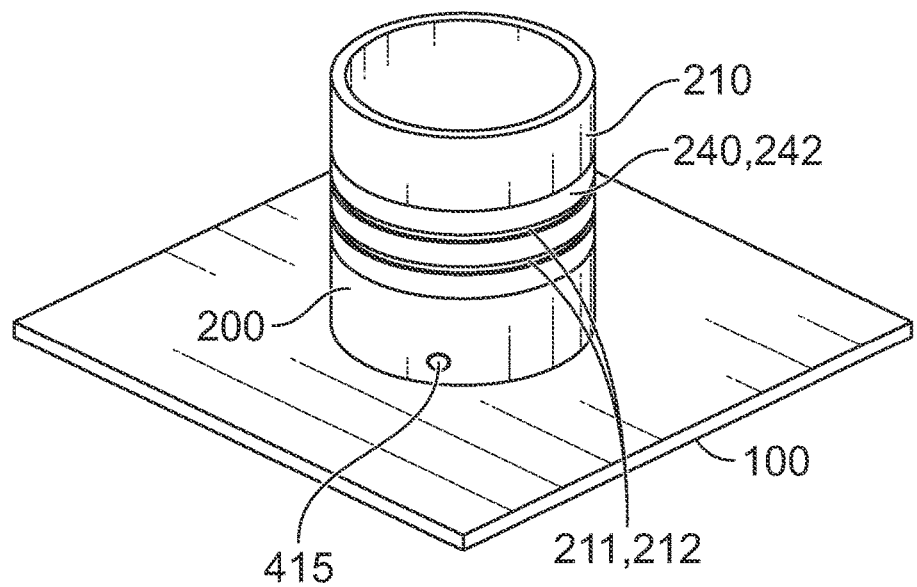
FIG. 2C is a front view of an embodiment of the device for repelling insects showing a base which is square shaped connected to a vertical post with an outer surface. This outer surface has at least two conductors with electricity, which are three conductive bands. It also shows the insulating spacers between the conductive bands and the LED flasher.

FIG. 2C is a front view of an embodiment of the device for repelling insects showing the base 100 which is square shaped connected to a vertical post 200 with an outer surface 210. The outer surface of the vertical post 200 has at least two conductors with electricity 240, which are at least two conductive bands 242. These at least two conductive bands 242 are flush with the outer surface of the vertical post. Also, the space between the at least two conductive bands 242 is an insulating spacer 211 which is an insulating ring in the outer surface of the vertical post 212. It further shows LED flasher 415 on the vertical post 200 which flashes when the device is low on power.

Figure 2D:
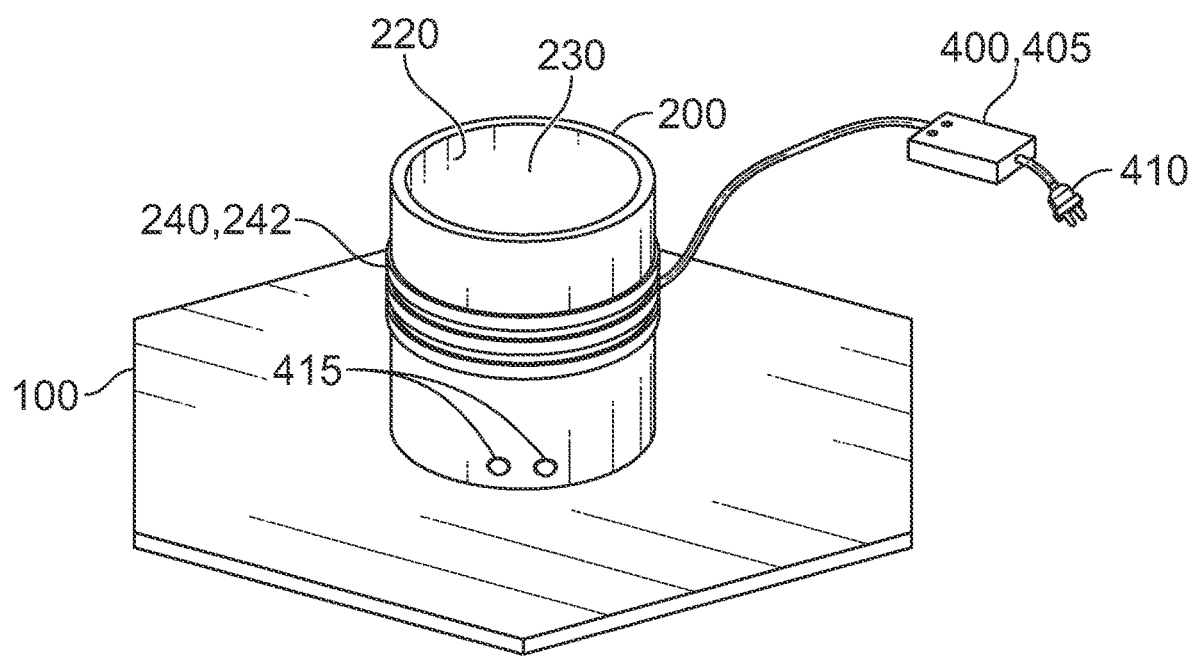
FIG. 2D is a front view of an embodiment of the device for repelling insects showing a base which is hexagonal in shape connected to a vertical post with at least two conductors with electricity, which are at least two conductive bands around the outer surface of the vertical post. It also shows the LED flasher and electronic assembly which is the external electronic assembly which includes a plug, which connects to a power source.

FIG. 2D is a front view of an embodiment of the device for repelling insects showing the base 100 which is hexagon shaped connected to a vertical post 200 with an inner surface 220 inside which there is a hollow space 230. The outer surface of this vertical post 200 has at least two conductors with electricity 240, which are at least two conductive bands 242. These at least two conductive bands 242 are connected to an external electronic assembly 405/400 via a plug 410. It also shows two LED flashers 415.

Figure 3:
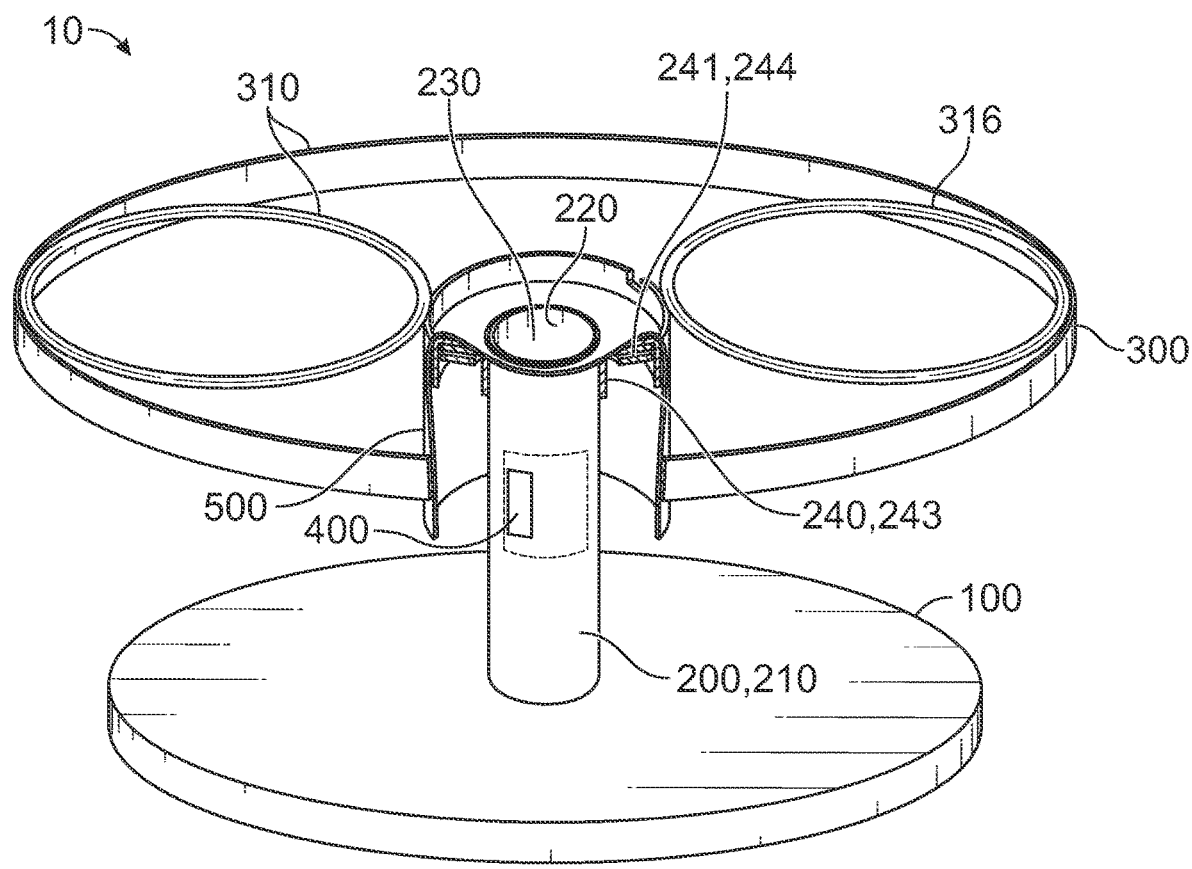
FIG. 3 is a front view of an embodiment of the device for repelling insects showing a base connected to a vertical post which is further connected to a capital. Here, the vertical post comprises of an outer surface, an inner surface, and a hollow space inside the inner surface. The capital has an upper surface and an underside skirt which goes over the vertical post and protects a horizontally placed conductive ring comprising of at least two conductors with electricity, which are at least two conductive bands with outer conductive bands and a middle band, in the hollow space of the vertical post.

FIG. 3 is a front view of an embodiment of the device for repelling insects 10 showing a base 100 connected to a vertical post 200 with an outer surface 210, inner surface 220, and a hollow space 230 inside the inner surface 220. A cut away view of the outer surface 210 and inner surface 220 is included in the vertical post 200 to show a representation of the electronic assembly 400 contained within the hallow space 230. This vertical post 200 is further connected to a capital 300. Here, the capital 300 has upper surface 310 which is configured as two bowls 316, and further has an underside skirt 500. This underside skirt 500 goes over the vertical post and protects the horizontally placed conductive ring 241 comprising of at least two conductors with electricity 240 with outer band conductive bands 243 and a middle band 244. It further shows the insulating spacers between the outer conductive bands 243 and the middle band 244.

Figure 4A:
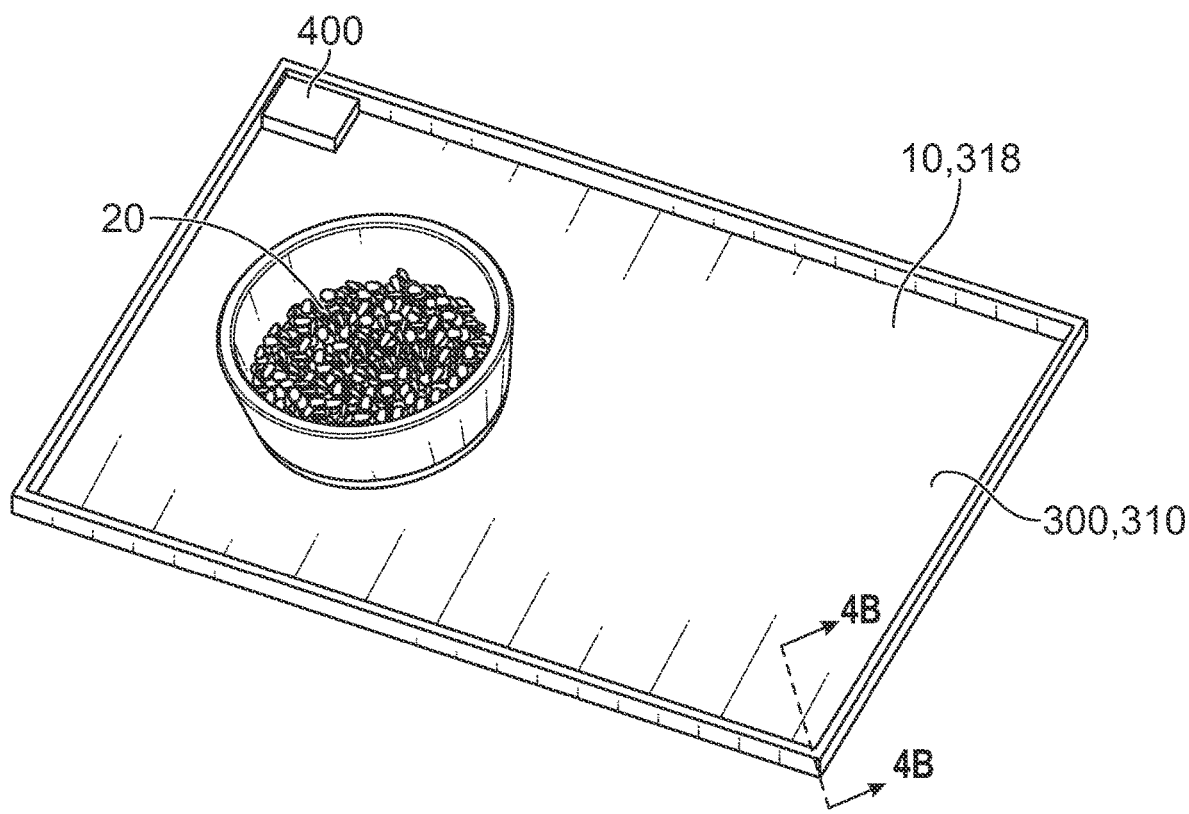
FIG. 4A is a top view of an embodiment of the device for repelling insects configured as a mat showing the pet food on the upper surface of the capital. In this drawing the electronic assembly is also placed on the capital. It also shows the cross section line of FIG. 4B on the lower edge of the device.

FIG. 4A is a top view of an embodiment of the device for repelling insects 10 configured as a mat or tray 318 showing pet food 20 in a bowl placed on the upper surface 310 of the capital 300. In this embodiment, the electronic assembly 400 is placed externally, on the upper surface of the capital. It also shows the cross-section line of FIG. 4B on the lower edge of the device.

Figure 4B:
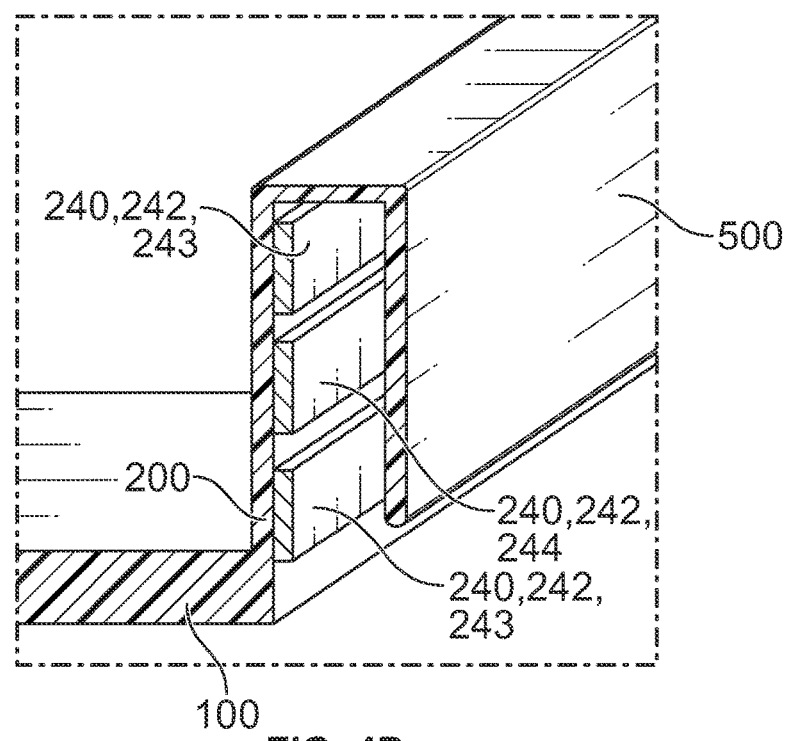
FIG. 4B is a perspective view of an embodiment of the device for repelling insects configured as a mat showing the base connected to the vertical post along the side of the mat where the underside skirt protects the at least two conductors with electricity which are at least two conductive bands further comprising outer conductive bands and middle band. This vertical post is further connected to the top side of the mat which is the capital.

FIG. 4B is a perspective view of an embodiment of the device for repelling insects which is configured as a mat or tray, showing the base 100 connected to the vertical post 200. Here, the vertical post is the raised surface on the side of the mat where the underside skirt 500 provides a protective surface for the at least two conductors with electricity 240 which are at least two conductive bands 242. The outer conductive bands 243 and middle band 244 are also visible in this drawing.

FIG. 4C is a perspective view of an embodiment of the device for repelling insects showing the device similar to FIG. 4B. In this embodiment the device for repelling insects is configured as a mat or tray, showing the base 100 connected to the vertical post 200. Here, the vertical post is the raised surface on the side of the mat where the underside skirt 500 provides a protective surface for the at least two conductors with electricity 240 which are at least two conductive bands 242. The insulating spacer 211 is visible in this drawing.

FIG. 5 is a front view of an embodiment of the device for repelling insects 10 showing the base 100 configured as a four-legged stable structure connected to the vertical post 200 which is further connected to the capital 300 which is a set of rims to support the pet food dishes. The upper surface 310 of the capital is configured as two bowls 316 to hold pet food. The capital configured as two bowls 316 of this embodiment, are placed within a set of rings, the two bowls are not shown in this figure to show the details of the rest of the device. Also, in this embodiment the underside skirt 500 is part of the vertical post 200.

Figure 6:
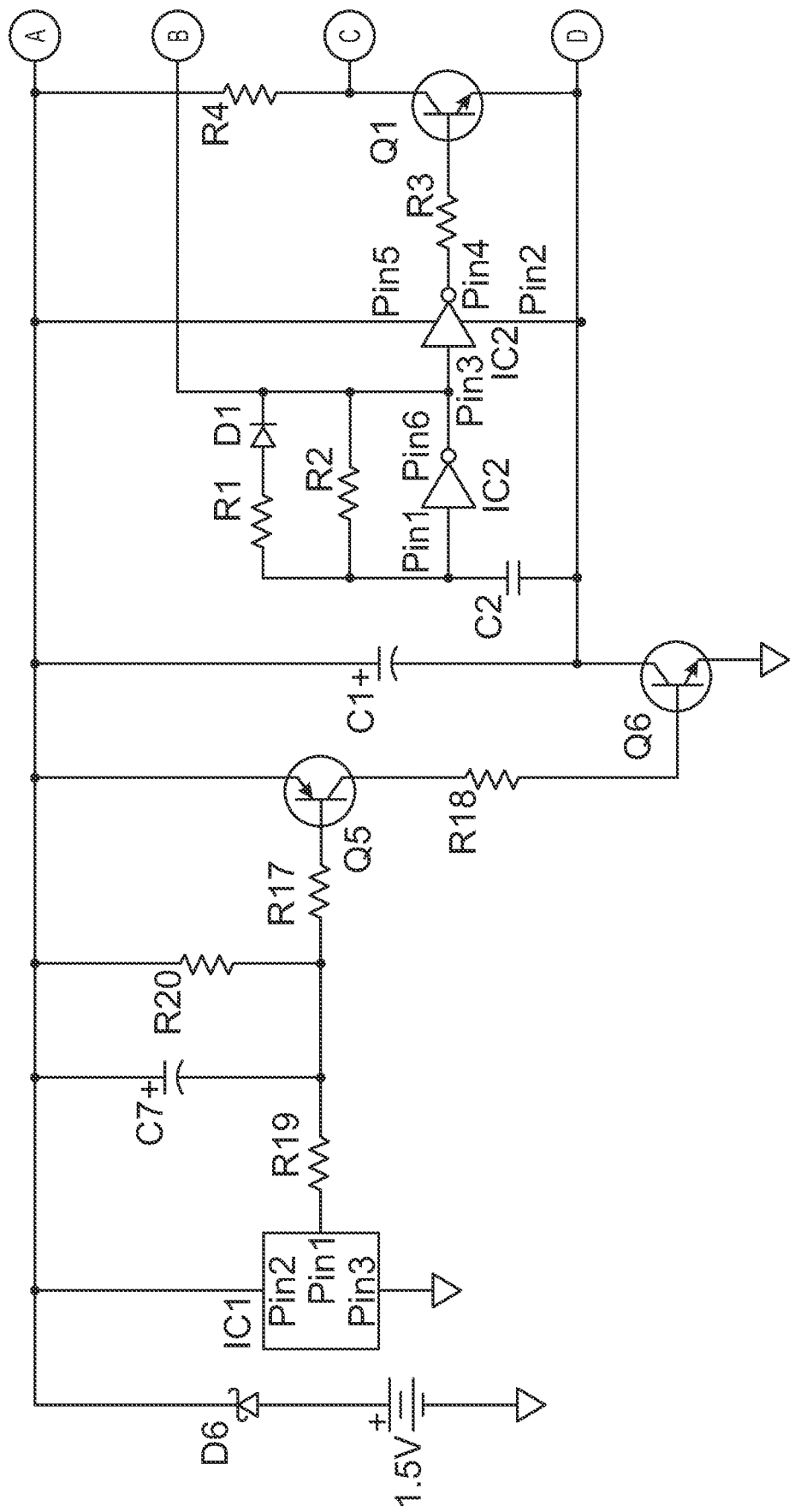
FIG. 6 illustrates one embodiment of the electronic assembly's circuit with power source which is a 1.5V battery.
Figure 6:
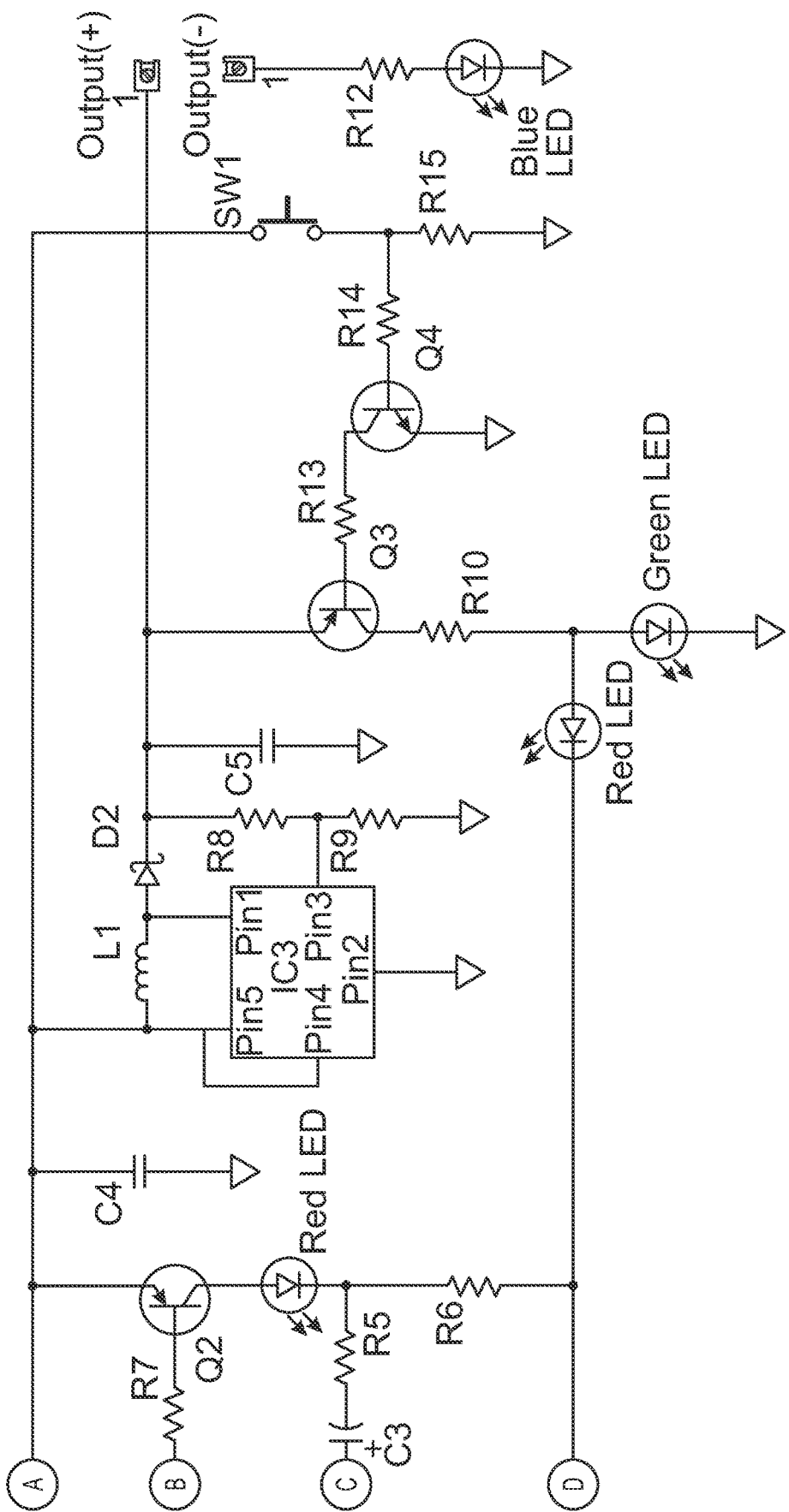

FIG. 6 illustrates a way to design the circuit which is the manner in which the electronic assembly is structured to make the device for repelling insects function. This circuit essentially comprises of a power source which is a 1.5V battery, a reverse polarity protection diode, a battery supervisor chip and low battery flasher, a battery test push button switch, with capacitors and resistors to create time delay, a DC-to-DC boost integrated circuit chip, transistors with related base, pull-up, and pull-down resistors, noise filter capacitors, flasher circuit components, green, red, and blue Light Emitting Diodes (LEDs), and resistive load for output. Following is the key to all the components of the circuit listed in this drawing:

D6: Reverse-polarity protection diode
IC1: Battery supervisor integrated circuit chip
R19: Resistor for time delay for battery test switch
C7: Capacitor for time delay for battery test switch
Q5: Transistor for isolating IC1 from 33-volt output when SW1 is pressed
R17: Base resistor for Q5 transistor
R20: Pull-up resistor for Q5 transistor
Q6: Transistor for isolating IC1 from 33-volt output when SW1 is pressed
R18: Base resistor for Q6 transistor
C1: Electronic noise filter capacitor
R1: Flasher circuit component
D1: Flasher circuit component
R2: Flasher circuit component
C2: Flasher circuit component
IC2: Flasher circuit component
R3: Flasher circuit component
Q1: Flasher circuit component
R4: Flasher circuit component
R7: Flasher circuit component
Q2: Flasher circuit component
C3: Flasher circuit component
R5: Flasher circuit component
R6: Flasher circuit component
Red LED: Flashes when battery voltage is low
C4: Noise filter capacitor
L1: DC-to-DC booster circuit component
D2: DC-to-DC booster circuit component
R8: DC-to-DC booster circuit component
R9: DC-to-DC booster circuit component
IC3: DC-to-DC booster circuit component
C5: DC-to-DC booster circuit component
R10: Output resistor for Red and Green LED
Q3: Transistor for isolating SW1 from 33-volt output. Enables SW1 to use 1.5 volts to send 33 volts to Green LED
R13: Base resistor for Q3 transistor
Q4: Transistor for isolating SW1 from 33-volt output. Enables SW1 to use 1.5 volts to send 33 volts to Green LED
R14: Base resistor for Q4 transistor
R15: Pull-down resistor for Q4 transistor
SW1: Momentary Push button switch for testing battery
R12: Resistive load for indicator light Blue LED, when conductors are bridged
Blue LED: Indicator light for output, when conductors are bridged.

In this embodiment, when a 1.5V AA battery is installed, 1.5 volts positive power is sent to the battery supervisor integrated circuit chip IC1, via the positive power rail, and ground. Power is also sent to the voltage booster integrated circuit chip IC3, which stays in an ON state, due to the Shutdown Pin 4 being connected to the positive rail. IC3 outputs to one polarity of the insect repelling conductors. The other polarity of the insect repelling conductors is connected to ground, via R12 and Blue LED. This makes a 33-volt potential between the two sides (poles) of the conductors. When IC1 senses the power source which is the battery to be low, i.e., in a situation where, battery voltage drops below the preset level (1.2 volts in the current embodiment), it sends 1.2 volts negative power through the resistor R19 and begins charging capacitor C7. If voltage is still low after C7 is fully charged (about 8 seconds), negative power is passed on to the inverter integrated circuit chip IC2 and the remainder of the flasher circuit, via the two transistors Q5 and Q6. This turns on the flasher circuit and causes Red LED #1 to flash.

If the tactile pushbutton switch SW1 is pressed and IC1 is not activated (battery is not low), 33 volts is sent to Green LED via transistors Q4 and Q3, which lights the diode. If SW1 is pressed and IC1 is activated (battery is low), 1.2 volts (or less, depending on the level of battery depletion), is sent to ground via diode D3 and resistor R16, preventing the Green LED from lighting.

FIG. 7 illustrates one embodiment of the electronic assembly's DC-to-DC booster circuit components:
IC3: Integrated circuit chip
L1: DC/DC booster circuit components
D2: DC/DC booster circuit components
R8: DC/DC booster circuit components
R9: DC/DC booster circuit components
C5: DC/DC booster circuit components
R12: Resistive load for output Device for repelling insects 10 refers to the present invention which is used to prevent crawling insects from gaining access to the pet food. In general, this device for repelling insects comprises of a base, a vertical post, and a capital all of which are defined below.

Pet Food 20 refers to solid or liquid food consumed by pets.

Base 100 is defined as a supporting structure from below. This base is the foundation that supports an upright structure like a vertical post of this invention. This base can be any flat and planar structure of any shape, or could have feet or legs. In one embodiment of this invention, the base is a flat, 9" diameter circular disc. This circular disc can be made of plastic, wood, metal, or any other material that can withstand the weight of the upright structure like the vertical post. The base can also be comprised of least two legs which can be made of plastic, wood, metal, or any other material that can withstand the weight of the upright structure like the vertical post. In another embodiment of this invention, the base is the ground.

Vertical Post 200 is an upright columnar structure which houses an electronic assembly required to operate the present invention. This vertical post has an outer surface, an inner surface, a hollow space inside the inner surface, and at least one aperture. The outer surface of the vertical post further optionally includes parallel shallow grooves which can accommodate the at least two conductors with electricity. Alternatively, the at least two conductors with electricity can be wrapped around the outer surface of the vertical post. In one embodiment, one end of each conductor passes through an aperture in the vertical post, and all ends are soldered together creating continuous conductive bands with small spaces between each band on the outer surface. Along these spaces, the vertical post acts as an insulating spacer, or have a separate insulating spacer installed between each conductor. In another embodiment, each conductor further connects to another wire rather than the conductor itself passing into the hollow space. The at least two conductors with electricity along the outer surface of the vertical post are connected to an electronic assembly (described below) via a connection. When a crawling insect attempts to get to the pet food, it will have to crawl up the vertical post and will make contact with at least two conductors of opposite polarity which are adjacent to each other. When the crawling insect makes contact with the at least two conductors of opposite polarity, it will complete the circuit (further described below). This will shock the crawling insect and make it fall off the assembly. In some embodiments, the hollow space inside the vertical post houses the remainder of the electronic assembly (further described below) required to shock and repel the crawling insect. In some embodiments, the energy sources like a 1.5V AA and a 1.5V AAA battery also fit upright in a convenient vertical post.

Outer Surface 210 refers to the exterior surface of the vertical post which is visible to the user's eye. This outer surface optionally includes parallel shallow grooves which can accommodate the at least two conductors with electricity. The space between the parallel grooves on the vertical surface acts as an insulating surface. Alternatively, the at least two conductors with electricity can be wrapped around the outer surface of the vertical post. The outer surface of the vertical post acts as an insulating spacer between the at least two conductors with electricity. Alternatively, insulating spacers like insulating washers can be added on to the outer surface, between each adjacent conductor. In another alternate version, the outer surface of the vertical post is the conductor.

Insulating Spacer 211 refers to the space between the at least two conductors around the vertical post, often with at least two conductors. This surface is the opposite of the at least two conductors with electricity and does not readily allow the current to pass. This allows the crawling insect to bridge the circuit. Common examples of insulating surfaces include glass, air, wood, plastic, and rubber. In its preferred embodiment the insulating surface of the present invention is made of plastic.

Spacer is ring in the outer surface of the vertical post 212 refers to the insulating spacer which can be added between the at least two conductors with electricity. It allows the circuit to be incomplete unless a crawling insect makes contact with the at least two conductors with electricity by bridging the gap offered by this spacer.

Parallel shallow grooves 214 are optional and refer to the narrow cut, grooves, or depressions on the vertical post which accommodate the at least two conductors. These parallel shallow grooves are at least two parallel shallow grooves.

Inner Surface 220 refers to the interior surface of the vertical post. It also acts as the inner wall of the hollow space.

Hollow Space 230 refers to the empty space inside the inner surface of the vertical post. It holds the electronic assembly. In some embodiments, energy sources like AA or AAA batteries are placed upright within the hollow space.

At least two conductors with electricity 240 defines a material that lets the electrical current flow from one end of the circuit to the other end. In some embodiments, the at least two conductors with electricity can be wrapped around the outer surface of the vertical post. In other embodiments, the at least two conductors can be on the inner surface of the underside skirt. The at least two conductors with electricity can be a horizontally placed conductive ring positioned between the outer surface of the vertical post and the inner surface of the underside skirt. The at least two conductors have alternating polarities. Common examples of electrically conducting materials are platinum, gold, silver, aluminum, brass, copper, mercury, water, iron, graphite, conductive plastics, wire meshes, and steel. The present invention could use any of the above materials for its at least two conductors. In one embodiment, the present invention uses metallic strips, specifically, brass strips as its at least two conductors with electricity. In another embodiment, the present invention uses 3D printed conductive plastic as its at least two conductors with electricity. The at least two conductors with electricity can be three conductive bands. Three conductors are where the at least two conductors, mentioned above, are three conductors. Due to these three conductors, a crawling insect will have two chances to bridge the gap, close the circuit, and get shocked away from the pet food. Three conductors provide multiple advantages in the present invention: 1) it gives two chances to shock or repel a crawling insect; 2) having any more conductors increases the area that could possibly be bridged by water or food. It is important for the at least two conductors to stay dry to prevent reduction in the battery life. The at least two conductors could also be four conductors or more. However, having more than four conductors might be unnecessary and un-economical. The polarity connection alternates between the outer conductive bands and the middle band to create circuits. In one embodiment of the present invention, these at least two conductors which can be three conductors around the outer surface of the vertical post. When a crawling insect attempts to get to the pet food, it will have to crawl up the vertical post and will make contact with at least one conductor. The space between conductors is sufficiently small, such that when the crawling insect makes contact with the outer conductor it will simultaneously be making contact with the middle band of the at least two conductors, with opposite polarity, thereby completing the circuit (described below). This will shock the crawling insect and make it fall off the device. It is also important for the space between each conductor to be minimal and for each conductor to be wide enough to ensure that the crawling insect makes contact with at least two conductors of opposite polarities simultaneously. To accommodate even a small crawling insect like an ant, in its preferred embodiment, the at least two conductors of opposite polarities are spaced approximately 1 mm apart from each other and each conductor is about 3 mm wide. Furthermore, where the at least two conductors with electricity are metallic bands, the metallic bands could get tarnished over a period of time and would require periodical polishing.

Conductive Ring 241 refers to one of the at least two conductors positioned between the outer surface of the vertical post and the inner surface of the underside skirt. In the embodiments shown, the conductive ring is oriented horizontally.

At least two conductive bands 242 refer to the at least two conductors with electricity on the vertical post. The at least two conductive bands can be three bands. On the inside of the vertical post, the outer conductive bands and the middle conductive band are alternatively connected to the electronic assembly. The first end of each conductive band passes through an aperture in the vertical post into the hollow space of the vertical post. The other end of the conductive band is wrapped over the aperture and soldered into the first end of the metallic band. This way at least two conductive bands form continuous conductive bands/surfaces around the vertical post. On the outside of the vertical post, these conductive bands can either directly be wrapped on the vertical post, along its outer surface, or these conductive bands can be placed in optional parallel shallow groove scored on the outer surface of the vertical post. These conductive bands can be made of any conducting metals like platinum, gold, silver, copper, brass, steel, and aluminum, or conductive plastics which are engineered materials filled with conductive additives to attain a specific level of electricity. These conductive plastics usually contain materials like carbon fillers such as carbon black, graphite, and other conductive elements. In one embodiment the conductive bands of the present invention are brass bands. Brass bands are affordable and provide a wider surface for the crawling insect to make contact with than a band of similarly priced metal. These bands can be of varying width to accommodate different sizes of optional parallel shallow grooves on the vertical post. In one ideal embodiment, the metallic bands are about ⅛" or 3 mm wide. This width also makes it easy to have a clean, straight upper and lower edges when the band wraps around the vertical post. In its preferred embodiment, the spacing between each parallelly adjacent conductive bands is approximately 1 mm. The average size of the common ant is about 5 mm in length and 2 mm in width. Thus, the 1 mm spacing is sufficiently small to accommodate small crawling insects like ants which would have to have at least one foot on any given conductive band in order to cross to the adjacent band and make its way up the vertical post.

Outer Conductive Bands 243 refers to the top and bottom conductive bands if three conductors are aligned on a vertical post.

Middle band 244 refers to the middle metallic band of the three conductors, if three conductors are aligned on a vertical post.

At least one aperture 250 refers to a hole or opening on the vertical post through which the at least two conductors with electricity pass from the outer surface of the vertical post to the inner surface of the vertical post, to connect to the electronic assembly, via the connection. The conductors could also pass on top of the at least one aperture and connect to the electronic assembly, via the connection.

Connection 260 refers to the means of joining different ends of the circuit to allow flow of electricity into the electronic assembly. Connections are usually wires-insulated, bare, or extensions of conductors.

Capital 300 refers to the structure that holds pet food. This further includes an upper surface with an underside skirt.

Upper Surface 310 refers to the stable surface that directly holds pet food.

Platform 311 refers to a configuration of the upper surface which is a raised level surface which can be used to hold pet food. This platform can hold pet food in one, two, or more dishes. In one embodiment the platform is a capital on a vertical post connected to a base with three legs. In this embodiment, the platform is an elongated or oval upper surface with an underside skirt and which is capable of holding at least one dish. In another embodiment, the platform with a base, the vertical post, and an elongated or oval upper surface with an underside skirt and which is capable of holding two dishes or more.

At least one dish 312 refers to an embodiment of the present invention where the platform accommodates at least one dish.

Two dishes 313 refer to an embodiment of the present invention where the platform accommodates two dishes.

Bowl refers to an embodiment of the present invention where the device is configured to be in the shape of a regular bowl. This bowl can directly be used to hold pet food. Here, the conductors are wrapped around the bowl, above the base, where the bowl itself acts as the vertical post, while the bowl is the upper surface which holds the pet food.

Two Bowls 316 refers to an embodiment of the present invention where the device is configured to be two bowls. These bowls can directly be used to hold pet food.

Mat 318 refers to a mat which can be a tray or a flexible silicone mat with an underside skirt to set pet food on. The top side of the mat serves as the capital with an upper surface with an underside skirt. The bottom side of the mat serves as the base. The gap between the base and the upper surface, is a raised area, and it serves as the vertical post. On this mat, the conductors run around the vertical post, whereas the insulator is across the top and side-by-side. Furthermore, the circuit may be mounted on top of the upper surface of the mat.

Electronic Assembly 400 refers to the components of a circuit of the present invention. This electronic assembly can be wholly contained in the hollow space inside the inner surface of the vertical post, and is connected to the conductors around the outer surface of the vertical post. Alternatively, this electronic assembly can be external to the vertical post. Notable components of this electronic assembly are the at least two conductors with electricity on the outer surface of the vertical post, a power source to power the circuit, an optional voltage regulator, a DC-to-DC booster, and a LED flasher. Power source refers to either the internal energy source within the circuit or the external energy source where the electronic assembly can be extended past the vertical post and externally plugged into an electrical socket. An internal energy source can be any battery. In an exemplary embodiment, a single 1.5V AA battery provided a best balance of battery life, size, and price. Any other battery, like a single 1.5V AAA battery, two AAA batteries in series (3V), a single 1.5V AA battery, two AA batteries in series (3V), a single 1.5V C battery, a single 1.5 V D battery, a 3V coin cell battery, and 1.5 to 3V solar cells, can also be used as a power source. A voltage regulator is optional and creates and maintains a fixed output voltage irrespective of changes to the input voltage or load conditions. Any adjustable linear voltage regulator can be used in this invention. A LM317 voltage regulator chip, manufactured by Texas Instruments and is a 1.5 A, 40V adjustable linear volage regulator produced the best result as it was able to hold the current output at about 2 milliamps which kept the ants from getting stuck across the conductor while providing the minimum required voltage of 15 volts which was sufficient to shock the crawling insects and prevent them from crossing into the pet food. If the current were to be over 2 milliamps, the crawling insects get stuck on the conductors. However, the maximum current output of this circuit can go up to 5 milliamps. The electronic assembly also consists of a DC-to-DC booster which generates a DC output voltage that is greater than the DC input voltage, thereby boosting the supply voltage. In the present invention, the DC-to-DC booster increased the supply voltage of 1.5 volts to a maximum output voltage of 40 volts. The DC-to-DC booster has an input range of 1V to 15V, and a maximum voltage output of 40V. However, the ideal voltage required to shock the crawling insects but not kill them is 15V, and the maximum is 33V. The LED flasher in this electronic assembly allows the user to determine the battery life of the invention by shining a flashing LED light when the battery is depleted. Circuit refers to the path the electricity flows through the device. This circuit can be internally placed within the vertical post, or can be placed externally on the upper surface. In its preferred embodiment, the circuit of this invention consists of a battery, a reverse polarity diode which prevents damage to the components of the device if the battery were to be placed in backwards, a battery supervisor integrated circuit chip, which monitors battery voltage and triggers at a preset value, a resistor and capacitor which create a several second time delay to prevent false triggering of low battery flasher due to temporary voltage drop, such as when battery test button is pressed or conductors are bridged, transistors and related base, pull-up, and pull-down resistors, noise filter capacitor, flasher circuit components, a push button switch and Green Light Emitting Diode for battery test feature, Red Light Emitting Diode for low battery indication, two conductors of opposite polarity, and a Blue Light Emitting Diode, with related resistive load for output, to indicate when conductors have been bridged External Electronic Assembly 405 refers to the electronic assembly which extends from the vertical post and connects to an external power source like an electrical outlet via a plug.

Plug 410 refers to a device for making an external electrical connection between the device and an external power source like an electrical outlet. It essentially consists of metal pins in insulated casing that fit into the electrical outlet.

LED flasher 415 refers to a Light Emitting Diode in the circuit. This LED served two purposes in the present invention: 1) it prevents a pure short circuit if a crawling insect, water, or something else conductive bridged the conductors; 2) it makes for a good warning indicator of conductor bridging; and 3) it provides an easy way to test the battery.

Underside skirt 500 refers to the edge protruding from beneath the capital, but not reaching the base or ground. It may also refer to the part of the vertical post in certain embodiments. It protects pets and owners from making accidental contact with the conductors and triggering the shock mechanism. It further shields the at least two conductors from water, pet food, and other things that could affect their performance.

Part of the capital 510 refers to the underskirt which is part of the capital.

Part of the vertical post 520 refers to the underskirt which is part of the vertical post.

One embodiment example is a device for repelling insects comprising a base, a vertical post extending from the base to support a capital, where the vertical post includes at least two conductors with electricity being around an outer surface of the vertical post. In this embodiment, the capital rests on top of the vertical post and is configured to hold pet food on an upper surface. The capital further has an underside skirt beneath it surrounding the at least one of the at least two conductors being around the outer surface of the vertical post and the at least two conductors will complete an electrical circuit if an insect makes contact with at least two of the at least two conductors.

Second embodiment example is the device of previous embodiment wherein the at least two conductors are three conductors.

Third embodiment example is the device of the first embodiment wherein the vertical post further comprises an inner surface, and a hollow space inside the inner surface of the vertical post.

Fourth embodiment example is the device of the previous embodiment where one of the at least two conductors is the outer surface of the vertical post and an inner surface of the underside skirt, and one of the at least two conductors is a conductive ring positioned between the outer surface of the vertical post and the inner surface of the underside skirt.

Fifth embodiment example is the device of the third embodiment where the at least two conductors on the outer surface of the vertical post are at least two conductive bands mounted to the outer surface of the vertical post and there are insulating spacers between each of the at least two conductive bands, which keep each of the at least two conductors from completing the electrical circuit unless an insect makes contact with the at least two of the at least two conductors.

Sixth embodiment example is the device of previous (fifth) embodiment where the outer surface of the vertical post between each of the at least two conductors creates the insulating spacer between each of the at least two conductors from completing the electrical circuit unless an insect makes contact with at least two of the at least two conductors.

Seventh embodiment example is the device of the sixth embodiment where each of the at least two conductive bands have a connection to an electronic assembly through at least one aperture in the vertical post into the hollow space of the vertical post; and the electronic assembly includes a power source.

Eighth embodiment example is the device of the seventh embodiment where the at least two conductive bands are three conductive bands where two outer conductive bands are connected together to the electronic assembly and a middle band of the three conductive bands is also connected to the electronic assembly.

Ninth embodiment example is the device of the eighth embodiment wherein the connection to the electronic assembly extends outside of the hollow space of the vertical post to an external electronic assembly, the external electronic assembly includes a plug, and the power source is an electrical outlet.

Tenth embodiment example is the device of the eighth embodiment wherein the electronic assembly is wholly contained within the vertical post of the device.

Eleventh embodiment example is the device of the tenth embodiment wherein the electronic assembly further includes, a DC-to-DC booster, a LED flasher; and a power source which is a single 1.5V AA battery.

Twelfth embodiment example is a device for repelling insects comprising a base, a vertical post extending from the base to suppose a capital, the vertical post includes an outer surface, the vertical post includes three conductive bands around the outer surface of the vertical post which are mounted in three parallel shallow grooves. In this embodiment, insulating spacers made from rings are placed between each of the three conductive bands on the outer surface of the vertical post. The conductive bands further have a connection to an electronic assembly consisting of a power source, a DC-to-DC booster, and a LED flasher. In this embodiment, the power source is a single 1.5V AA battery, the DC-to-DC booster boosts the voltage and amperage to an acceptable range. In the present embodiment, the capital rests on top of the vertical post, is configured to hold pet food in at least one dish on an upper surface, and has an underside skirt that protects pets and users from making accidental contact with the three conductive bands.

Thirteenth embodiment example is the device of the above (twelfth) embodiment wherein the upper surface of the capital is configured as a platform to hold pet food in at least one dish.

Fourteenth embodiment example is the device of the twelfth embodiment wherein the upper surface of the capital is configured as a platform to hold pet food in two dishes.

Fifteenth embodiment example is the device of the twelfth embodiment wherein the upper surface of the capital is configured as a bowl to hold the pet food.

Sixteenth embodiment example is the device of the twelfth embodiment wherein the upper surface of the capital is configured as two bowls to hold the pet food.

Seventeenth embodiment example is the device of the twelfth embodiment wherein the upper surface of the capital is configured as a mat.

By example, the method of making a device for repelling crawling insects from entering pet food comprising the steps of: mounting a vertical post with an inner and outer surface and a hollow space inside the inner surface on top of a base; mounting a capital configured to hold pet food on an upper surface with an underside skirt to protect pets and users from making accidental contact, on top of the vertical surface; mounting at least two conductive bands around which act as at least two conductors with electricity, around parallel shallow grooves of the vertical post, flush with the outer surface of the vertical post, while creating an insulating spacer between each of the at least two conductive bands, which keeps the at least two conductive bands from completing an electrical circuit unless an insect makes contact with at least two of the at least two conductors; alternately connecting each of the at least two conductive bands to an electronic assembly through at least one aperture in the vertical post; and including a power source with the electronic assembly.

By example, the method of making a device for repelling crawling insects from entering pet food from the previous example, further comprising the steps of: including a power source, a DC-to-DC booster, and a LED flasher to the electronic assembly; providing a single 1.5V AA battery as the power source; having the DC-to-DC booster boost the voltage and amperage to an acceptable range.

By example, the method of making a device for repelling crawling insects from entering pet food from the first method example, further comprising the steps of: extending the connection to the electronic assembly outside of the hollow space of the vertical post to an external electronic assembly; including a plug with the external electronic assembly; and plugging into an electrical outlet as the power source.

What is claimed is:

1. A device for repelling insects comprising:
a base;
a vertical post extending from the base to support a capital;
the vertical post includes three conductors with electricity, the three conductors being around an outer surface of the vertical post;
the vertical post includes an inner surface, and a hollow space inside the inner surface of the vertical post;
the capital rests on top of the vertical post;
the capital is configured to hold pet food on an upper surface;
an underside skirt beneath the capital and surrounding at least one of the three conductors being around the outer surface of the vertical post; and
the three conductors on the outer surface of the vertical post are three conductive bands mounted to the outer surface of the vertical post and there are insulating spacers between each of the three conductive bands, which keep each of the three conductors from completing the electrical circuit unless an insect makes contact with at least two of the three conductors.

2. The device of claim 1 further comprising:
the outer surface of the vertical post between each of the three conductive bands creates the insulating spacers between each of the three conductive bands.

3. The device of claim 2 further comprising:
each of the three conductive bands have a connection to an electronic assembly through at least one aperture in the vertical post into the hollow space of the vertical post.

4. The device of claim 3 further comprising:
two outer conductive bands of the three conductive bands are connected together to the electronic assembly and a middle band of the three conductive bands is also connected to the electronic assembly.

5. The device of claim 4 wherein the connection to the electronic assembly extends outside of the hollow space of the vertical post to an external electronic assembly, the external electronic assembly includes a plug.

6. The device of claim 4 wherein the electronic assembly contains a battery.

7. The device of claim 6 further comprising:
the electronic assembly includes a DC-to-DC booster and a LED flasher; and
the battery is a single 1.5V AA battery.

8. A device for repelling insects, comprising:
a base;
a vertical post extending from the base to support a capital;
the vertical post includes an outer surface;
the vertical post further includes three conductive bands around the outer surface of the vertical post;
the three conductive bands around the outer surface of the vertical post are mounted in three parallel shallow grooves;
between each of the three conductive bands are insulating spacers made from raised rings in the outer surface of the vertical post;
the conductive bands have a connection to an electronic assembly;
the capital rests on top of the vertical post;
the capital is configured to hold pet food in at least one dish on an upper surface;
the capital has an underside skirt that protects pets and users from making accidental contact with the three conductive bands.

9. The device of claim 8 wherein the upper surface of the capital is configured as a platform to hold pet food in at least one dish.

10. The device of claim 8 wherein the upper surface of the capital is configured as a platform to hold pet food in two dishes.

11. The device of claim 8 wherein the upper surface of the capital is configured as a bowl to hold the pet food.

12. The device of claim 8 wherein the upper surface of the capital is configured as two bowls to hold the pet food.

13. The device of claim 8 wherein the electronic assembly consists of a power source, a DC-to-DC booster, and a LED flasher; and the power source is a single 1.5V AA battery and the DC-to-DC booster boosts the voltage and amperage to an acceptable range.

14. A method for making a device for repelling crawling insects from entering pet food comprising the steps of:
mounting a vertical post, with an outer surface, on top of a base and resting a capital on top of the vertical post;
mounting three conductive bands around the outer surface of the vertical post in three parallel shallow grooves;

configuring the outer surface of the vertical post to include insulating spacers made from raised rings in between each of the three conductive bands;

configuring the capital with an upper surface to hold pet food in at least one dish, and an underside skirt that protects pets and users from making accidental contact with the three conductive bands; and connecting the three conductive bands to an electronic assembly.

\* \* \* \* \*